March 26, 1963 P. HOPF ETAL 3,082,530
DRILLING AND LIKE TOOLS
Filed Sept. 28, 1960 2 Sheets-Sheet 1

Inventor:
PAUL HOPF, HERMANN HOPF
by
Mestern & Rollin
ATTORNEYS

Fig. 4
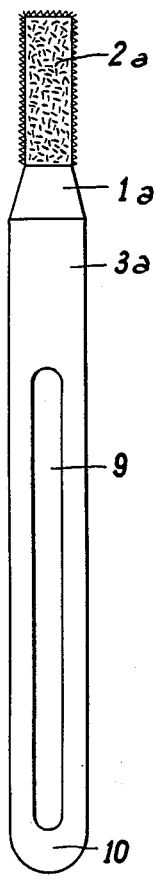
Fig. 5
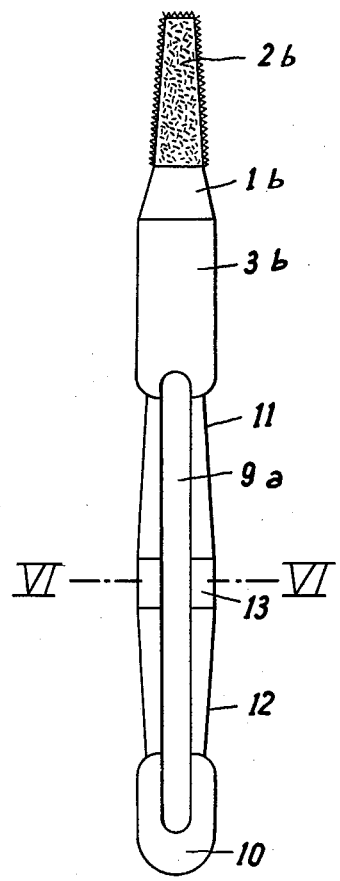
Fig. 6
Inventors:
PAUL HOPF, HERMANN HOPF
by Mestern & Kollin
ATTORNEYS

United States Patent Office 3,082,530
Patented Mar. 26, 1963

3,082,530
DRILLING AND LIKE TOOLS
Paul Hopf, Tietzenweg 75, and Hermann Hopf, Heinersdorferstrasse 31A, both of Berlin-Lichterfelde, Germany
Filed Sept. 28, 1960, Ser. No. 59,036
Claims priority, application Germany Apr. 28, 1960
4 Claims. (Cl. 32—59)

The present invention relates to tools for drilling, grinding or milling which are used in particular in high-speed dental drills or handpieces, preferably incorporating a turbine drive. The handpieces may be straight or contra or right-angle handpieces. Hereinafter they will be referred to simply as "handpieces."

High-speed dental handpieces incorporating a turbine drive are known; their speeds fluctuate within wide limits up to 300,000 revolutions per minute and more. Such handpieces have increasingly gained ground lately because on the one hand, as a result of the very large increase of speed, the grinding power is considerably increased and thereby treatment time is shortened, and on the other hand the speeds are situated above the limit of sensitivity to vibration and, therefore, a more considerate treatment of the patient is ensured.

Known handpieces incorporating a turbine drive have a socketed receiving member into which the shaft of a selected tool is inserted, the shaft being merely held by friction between itself and the internal surface of the socket. For constructional reasons, no locking or clamping members can be employed for the tool shaft with these high-speed turbine-drive handpieces such as are always used in ordinary handpieces. In turbine-drive handpieces the friction between the socketed receiving member or chuck and the surface of the shaft must be sufficient to hold the tool in the axial direction as well as in the direction of rotation. The mounting of the shaft in the axial direction is particularly important in order to make it absolutely certain that the tool cannot shoot out of the socket during the operation, since this could lead to very severe injuries and damage to the patient, especially where treatment is being carried out inside the mouth cavity. For this reason the friction between the socket or chuck and the shaft must be very great in order to ensure safe operational conditions.

Synthetic organic plastic materials are usually used as chucks to receive the tool-shaft sockets, said sockets being exchangeably secured in the axis of the turbine. Metal sockets have also become known that are provided with a member acting in the manner of a collet chuck, into which the end of the shaft of the tool is pressed. In order to introduce the shaft into the chuck, it is necessary to apply a relatively large force so that the tool will be held in the chuck with sufficient friction. In order to reduce the required exertion on the part of the operator, the apex of the tool is usually pressed against a suitable support, the tool being introduced by pressure on the handpieces.

As a result, damage to the grinding, drilling or milling tool often occurs owing to bending and deformation, and therefore an uneven wear of the tool can ensure; in many cases, the tool is so badly damaged that it must be discarded as useless. The exchange of the tool is also difficult because it is impossible to remove the used tool by hand from the chuck. Therefore it has been proposed to provide an opening in the base of the handpiece which allows the introduction of a pin or the like to press out the tool. However, considerable pressure must be exerted because the shaft is very tightly gripped by the wall of the sleeve during use of the tool. It has also been proposed to make the handpiece closed, i.e. without a passage therethrough, in which case an auxiliary tool such as pliers is necessary by means of which the head of the drill in the handpiece can be gripped and pulled out with considerable force. This expenditure of energy may again lead to damage of the sensitive tool.

We have now found that it is possible to provide means for avoiding these drawbacks and for facilitating the handling and at the same time for substantially increasing the safety of operation.

According to the invention, there is provided a drilling, grinding or milling tool, particularly for dental drills or handpieces, in which the shaft of the tool has a shank portion which is slotted in the axial direction to form a plurality of deformable portions adapted to be forced apart by the centrifugal force of the spinning tool.

By virtue of this slotting, the tool may easily be introduced into or removed from a socketed member such as a chuck without the necessity of great force or auxiliary tools, and therefore the serious drawbacks associated with known tools are minimized or substantially eliminated. Moreover, there is a surprising and unexpected result, i.e. that in spite of the provision of a slot it is possible to obtain in operation not merely the same friction between the chuck and the shaft as that realizable with known tools employing massive shafts, but even an increased friction with consequent safer holding of the tool in the sleeve.

It will be appreciated that with the high speeds at which these tools are intended to be operated the centrifugal force acting on the slotted end of the shaft is so large that the parts of the shaft can expand outwardly and press into the surface of the chuck under the action of the centrifugal force. Therefore, the tool is positively driven in the direction of rotation without slip and it is not possible for the tool to come out of the chuck or sleeve axially during the operation. The same effect is obtained with metal sleeves having a resilient pliers-like receiving member, where also the friction in the receiving number is increased in the same manner during the operation by centrifugal force.

Therefore the slotting does not as one would assume, reduce friction during the operation, but even increases it by comparison with known tools having massive shafts and the invention therefore increases the operational safety in an unexpected manner. In the stationary state, friction is reduced by the slot to such an extent that it is possible easily to effect introduction and withdrawal.

At least one slot may be provided in the plane of a diameter of the shaft. Several axially directed parallel slots may also be provided. Also a pair of slots may be provided which intersect orthogonally at the central longitudinal axis of the shaft.

The width and length of the slot may be chosen at will; it is only determined by the necessity of obtaining the centrifugal force required for increasing friction. For example, the slot may extend over the whole length of the shaft or over a major part of the length thereof. Preferably the length of the slot is chosen so that it approximately corresponds to the depth of insertion of the shaft in a socketed receiving member such as a chuck. The width of the slot should be as small as possible. The slot may terminate in a transverse bore in order to increase the outward expansion of the shaft parts occurring as a consequence of the centrifugal force.

According to a modification, the slot in the shaft of the tool takes the form of an elongated transverse aperture in the portion of the shank to be inserted. In this modification, the extreme butt end of the shank is closed. At high rotational speed, the two walls of the aperture will deflect outward so as to achieve an increase in outside diameter whereby the tool is secured with equal effectiveness in axial and rotational direction. Such closed slots may likewise be arranged in a multiple or crosswise array.

The width of the slot should preferably be such that deflection of its walls by centrifugal force shall be ample to ensure secure retention in the socket; for example, the width of the slot may be a third of the diameter of the shank.

In accordance with a further feature of the invention, one or more grooves or other recesses may be provided on the surface of the shank in the portion occupied by the slot. Such recesses serve to facilitate insertion and removal of the tool when the handpiece is stationary, and also, in operation, to allow the relieved wall portions to press against or into the interior of the socket with greater force, so as further to ensure the desired secure retention during operation combined with ease of replacement involving a minimum of strain on the chuck and bearings.

In order that the invention may be more clearly understood, reference will now be made to be accompanying drawing which show several embodiments thereof by way of example, and in which:

FIGURE 4 shows a view of a grinding tool provided with a shaft slotted in axial direction, the slot being closed at the butt end;

FIGURE 5 shows a view similar to FIGURE 4, with additional recesses in the surface of the shaft; and FIGURE 6 shows a cross section along the line VI—VI of FIGURE 5.

Figure 1:
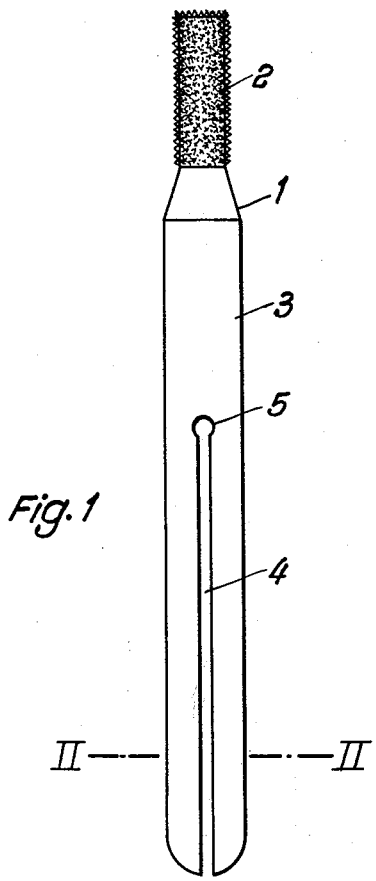
FIGURE 1 shows a view of a grinding tool provided with a shaft slotted in the axial direction.
Figure 2:
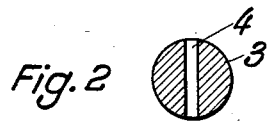
FIGURE 2 shows a cross section along the line II—II of FIGURE 1.

In FIG. 1, a grinding or drilling tool 1 is provided with a grinding or drilling head 2. Near the end of the outwardly cylindrical shaft 3, the tool is provided with a slot 4 which terminates in a transverse bore 5. Slot 4 is open toward the lower end of the shank and extends between diametrically opposite locations; it is bounded by flat faces parallel to an axial plane of the shaft (see also FIG. 2).

Figure 3:
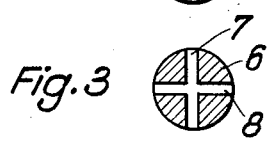
FIGURE 3 shows a cross section through a shaft end provided with crossed slots.

FIGURE 3 shows a modified form of slotting, in which the end of the cylindrical shaft 6 is provided with two slots 7, 8, which cross perpendicularly on the central longitudinal axis of the shaft 6. The slot or slots 4 or 7, 8 thus form a plurality of cylindrically spreadable portions at the insertion end of the shaft.

The shaft 3 or 6 of the tool is received in a socketed receiving member such as a chuck wherein it is held by friction. The chuck may be of any conventional kind and therefore has not been illustrated. On introducing the end of the shaft in the chuck, the slotted end of the shaft 3 or 6 is compressed, and therefore it is possible to introduce the tool and also to withdraw it from the sleeve without difficulty and without auxiliary tools. During the operation, centrifugal force acts on the end of the slotted shaft owing to the great speeds and said centrifugal forces are so large that the spreadable portions of the shaft formed by the slotting are forced apart, to be strongly pressed on the wall of the chuck and thus to increase friction in the axial direction as well as in the direction of rotation to such an extent that the tool is safely held in the chuck during operation. When the rotation is finished the centrifugal force is removed and therefore it is possible easily to withdraw the tool from the chuck.

The shaft may, if desired, extend conically towards its slotted end.

According to a modification illustrated by the embodiment of FIGURE 4, the tool comprises a burr 2a, shoulder 1a and shank 3a, to be inserted in a socket member not shown. In the portion of shank 3a to be inserted, there is provided a slot-like lengthwise aperture 9 extending in axial direction towards the butt end of the shaft but leaving a web 10 to close off the slot.

The embodiment of FIGURE 5 is a similar tool, having superficial recesses 11, 12 within the length occupied by the aperture 9a. At these recesses 11, 12, the diameter of the shank 3b is reduced, thereby greatly facilitating insertion and removal of the tool into and from the socket member. In operation, the wall parts adjoining the aperture are pressed outward by centrifugal force, so that the midportion 13 of shank 3b is expanded beyond the diameter of shank 3b against the wall of the socket member, thus ensuring secure retention of the tool when in action. The same advantage is afforded by the embodiment of FIGURE 4, where likewise the wall parts of shank 3a remaining alongside the aperture 9 are pressed outward by centrifugal force and make tight contact with or are forced against or into the inside wall of the socket member, with resulting positive drive of the tool in the direction of rotation and secure retention in axial direction. When the handpiece is stationary, the wall parts formed by the aperture 9 return to their rest positions as shown in the figures, so that the tool may now be easily removed or replaced without undue exertion and without the use of auxiliary tools.

What we claim is:

1. A tool for use in a high-speed dental handpiece, comprising an elongated shank of cylindrical external configuration formed with an insertion end receivable in a chuck of said handpiece and a working head rigid with said shank opposite said insertion end, said shank being provided with at least one longitudinal axial slot extending substantially from said insertion end over a major part of the length of said shank and subdividing it into a pair of resiliently deformable longitudinal portions, said portions being centrifugally spreadable upon rotation of said tool for frictional engagement by said chuck, said slot being open at diametrically opposite locations of said shank and being bounded by substantially flat faces parallel to an axial plane of said shank.

2. A tool for use in a high-speed dental handpiece, comprising an elongated shank of cylindrical external configuration formed with an insertion end receivable in a chuck of said handpiece and a working head rigid with said shank opposite said insertion end, said shank being provided with at least one longitudinal axial slot extending substantially from said insertion end over a major part of the length of said shank and subdividing it into a pair of resiliently deformable longitudinal portions, said slot terminating in a transverse bore provided in said shank intermediate said insertion end and said head, said portions being centrifugally spreadable upon rotation of said tool for frictional engagement by said chuck, said slot being open at diametrically opposite locations of said shank and being bounded by substantially flat faces parallel to an axial plane of said shank.

3. A tool for use is a high-speed dental handpiece, comprising an elongated shank of cylindrical external configuration formed with an insertion end receivable in a chuck of said handpiece and a working head rigid with said shank opposite said insertion end, said shank being provided with two orthogonally intersecting axial slots extending substantially from said insertion end over a major part of the length of said shank, thereby subdividing it into four resiliently deformable longitudinal portions, said portion being centrifugally spreadable upon rotation of said tool for frictional engagement by said chuck, each of said slots being open at diametrically opposite locations of said shank and being bounded by substantially flat faces parallel to a respective axial plane of said shank.

4. A tool for use in a high-speed dental handpiece, comprising an elongated shank formed with an insertion end receivable in a chuck of said handpiece and a working head rigid with said shank opposite said insertion end, said shank being provided with at least one longitudinal slot extending substantially from said insertion end over a major part of the length of said shank and subdividing it into a plurality of resiliently deformable longitudinal portions, said portions being centrifugally spreadable upon rotation of said tool for frictional engagement by said chuck, each of said portions having an intermediate region of relatively large cross-sectional area while tapering toward regions of relatively smaller cross-sectional area at the extremities of said portions.

References Cited in the file of this patent

UNITED STATES PATENTS

| 719,312 | Douhet | Jan. 27, 1903 |
| 881,691 | Hughes | Mar. 10, 1908 |
| 1,443,079 | Lefebvre et al. | Jan. 23, 1923 |

FOREIGN PATENTS

| 29,986 | Denmark | July 17, 1922 |